United States Patent [19]

Celada et al.

[11] 4,375,983
[45] Mar. 8, 1983

[54] METHOD OF MAKING SPONGE METAL

[75] Inventors: Juan Celada; Patrick W. MacKay; Juan F. Price-Falcon; Ricardo Viramontes-Brown, all of Garza Garcia, Mexico

[73] Assignee: Hylsa, S.A., Monterrey, Mexico

[21] Appl. No.: 234,317

[22] Filed: Feb. 13, 1981

Related U.S. Application Data

[63] Continuation of Ser. No. 33,693, Apr. 26, 1979, abandoned.

[51] Int. Cl.³ .............................................. C21B 13/02
[52] U.S. Cl. ..................................... 75/35; 75/90 R; 75/91; 266/156
[58] Field of Search ..................... 75/34, 35, 91, 90 R; 266/156

[56] References Cited

U.S. PATENT DOCUMENTS

| | | | |
|---|---|---|---|
| 2,653,088 | 9/1953 | Pike | 75/38 |
| 3,288,590 | 11/1966 | Keith et al. | 75/34 |
| 3,827,879 | 8/1974 | Celada et al. | 75/35 |
| 3,890,142 | 6/1975 | Celada et al. | 75/35 |
| 3,904,397 | 9/1975 | Celada et al. | 75/35 |
| 4,046,556 | 9/1977 | Celada et al. | 75/35 |
| 4,067,728 | 1/1978 | MacKay | 75/35 |
| 4,082,545 | 4/1978 | Malgarini et al. | 75/91 |
| 4,099,963 | 7/1978 | MacKay | 75/35 |
| 4,121,922 | 10/1978 | MacKay et al. | 75/34 |
| 4,152,139 | 5/1979 | Ramos et al. | 75/35 |

Primary Examiner—M. J. Andrews
Attorney, Agent, or Firm—Curtis, Morris & Safford

[57] ABSTRACT

A method for the batchwise reduction of iron ore to sponge iron in a multiple unit reactor system is disclosed in which (a) separate fixed beds of iron-bearing material are simultaneously treated in at least one cooling reactor and at least two reduction reactors, (b) a reducing gas composed largely of carbon monoxide and hydrogen is used to cool the iron-bearing material in said cooling reactor and thereafter to reduce the iron-bearing material in said reduction reactors, (c) a stream of said reducing gas is caused to pass through the fixed bed of iron ore in said cooling reactor and then cooled and (d) a portion of the cooled effluent reducing gas from said cooling reactor is recycled thereto, the improvement which comprises causing the remainder of the cooling reactor effluent gas to be fed to said reduction reactors and to flow in parallel through the fixed beds of metal-bearing material in said reduction reactors, and heating the reducing gas fed to said reduction reactors before it enters said reactors in a gas superheater without combustion of said gas to a temperature of at least 900° C.

7 Claims, 4 Drawing Figures

METHOD OF MAKING SPONGE METAL

This is a continuation of application Ser. No. 033,693 filed Apr. 26, 1979, now abandoned.

This invention relates to the batchwise gaseous reduction of metal oxides at elevated temperatures, and more particularly, to an improved method of operating a multi-unit reactor system for effecting such a reduction process. The invention is especially useful in connection with the direct gaseous reduction of iron oxide in lump or pellet form to sponge iron and will be illustratively described in connection with this use, although as the description proceeds it will become apparent that the invention can be equally well used in processes wherein metal oxide ores other than iron oxides are reduced.

In one of its aspects the present invention is an improvement in a known type of batch process for producing sponge iron which employs a reduction system comprising a plurality of functionally interchangeable reactors in which separate fixed beds of ferrous material are treated simultaneously. Process of this general type are disclosed, for example, in U.S. Pat. Nos. 3,423,201; 3,827,879; 3,890,142; and 3,904,397. A somewhat similar system is shown in U.S. Pat. No. 2,653,088. The principal operations carried out in a reactor system of this type are (1) reduction of the iron ore to sponge iron, (2) cooling of the reduced ore, and (3) discharging of the sponge iron from a reactor and recharging it with fresh ore to be reduced. Reduction is effected by a reducing gas which is commonly a mixture largely composed of carbon monoxide and hydrogen. The gas may typically be generated by catalytic conversion of a mixture of steam and methane, usually in the form of natural gas, into carbon monoxide and hydrogen in a catalytic reformer of known type.

The effluent gas from the reformer or other source of reducing gas is cooled to remove water therefrom and passed successively through a cooling reactor and one or more reduction reactors in series. During the cooling and reduction stages an additional reactor, sometimes called the charging or "turn-around" reactor and containing previously cooled reduced ore in the form of sponge, is isolated from the system so that the sponge iron can be discharged from the reactor and the reactor charged with fresh ore. The reactor system is provided with suitable switching valves whereby at the end of each cycle the gas flow can be shifted to cause the cooling stage reactor to become the charging reactor, the last reduction stage reduction reactor to become the cooling reactor and the charging reactor to become the first reduction stage reactor, and in cases where multi-stage reduction is used to cause the first reduction stage reactor to become the second stage reactor, the second reduction stage reactor to become the third reduction stage reactor, etc.

In order to achieve effective reduction of the metal-bearing material in the reduction reactors, the inlet reducing gas temperature should be at least about 900° C. In the existing industrial batchwise gaseous reduction sponge iron plants with which we are familiar, this temperature is attained in two steps. The reducing gas fed to each reduction reactor is commonly heated in an indirect heater, e.g., a gas-fired tubular heater, to a temperature of say 650° to 800° C., after which it flows to a combustion chamber associated with the reduction reactor wherein it is mixed with air or oxygen and a portion of the reducing gas is partially burned to further increase the temperature of the mixture to say 900° to 1100° C. before introduction into the reduction reactor. The effluent gas from each reduction reactor is cooled to remove water therefrom and then reheated before being introduced into the next successive reduction reactor. The hot gas normally flows downward through the bed of metal-bearing material in the reactor, although if desired it may also be caused to flow upwardly through the bed.

While batch processes of the type referred to above have been extensively used to produce sponge iron on an industrial scale and are capable of yielding a sponge iron product of a quality suitable for use as a feed to steel-making furnaces, there is still room for improvement in respect to the reducing gas economy, i.e., the volume of reducing gas required to produce a ton of sponge iron of a given percent metallization. In such systems the cost of the gas generating apparatus usually represents a substantial part of the total cost of the system. Hence from the standpoint of minimizing the investment required to produce a given tonnage of sponge iron of a given degree of metallization in a unit period of time, process modifications which decrease the amount of reducing gas required per ton of sponge iron are especially important since they make possible the use of a smaller, lower capacity catalytic reformer or other type of gas generator. A decrease in the size of the gas generator decreases the capital cost of the plant as well as the amount of fuel gas required to heat the generator. Also improved reducing gas economy decreases the cost of the natural gas required per ton of sponge iron produced.

One approach to the problem of achieving improved reducing gas economy is disclosed in U.S. Pat. No. 4,099,963 wherein a catalytically reformed reducing gas largely composed of carbon monoxide and hydrogen is used and improved economy is achieved by adding a minor amount of unreformed natural gas or methane to the reducing gas fed to one or more of the reduction reactors. The present invention is concerned with a somewhat different approach to the problem of improving reducing gas economy in such a batch reduction system.

It is accordingly a principal object of the present invention to provide an improved process for the direct batchwise gaseous reduction of oxidic metal ores to sponge metal. It is another object of the invention to improve the reducing gas economy of such a process in terms of volume of reducing gas consumed. It is still another object of the invention to reduce the capital cost of such a plant. Other objects of the invention will be in part obvious and in part pointed out hereafter.

As conducive to a clearer understanding of the present invention, it may be pointed out that in mixtures of methane, carbon monoxide, carbon dioxide, hydrogen and water vapor at temperatures within the range here of interest, e.g., 100° to 1100° C., the principal equilibria can be represented by the following equations:

$$CH_4 + H_2O \rightleftharpoons CO + 3H_2 - 49K \text{ cal.} \quad (1)$$

$$CO + H_2O \rightleftharpoons CO_2 + H_2 + 10K \text{ cal.} \quad (2)$$

$$CH_4 + CO_2 \rightleftharpoons 2CO + 2H_2 - 59K \text{ cal.} \quad (3)$$

In the foregoing equations the heat term is expressed in kilogram-calories per mol at 25° C. It will be noted that equations (1) and (3) are strongly endothermic. As will be pointed out below, it has been found that these equations have an important effect on the gas and thermal economy of the reduction process.

The equilibrium concentrations of the gaseous reactants in the foregoing equations vary as a function of temperature. The theoretical relation between equilibrium gas composition and temperature for such mixtures as determined by computer calculation is illustrated in Table I below.

TABLE I

|  | 500° C. | 700° C. | 900° C. | 1000° C. |
|---|---|---|---|---|
| $H_2$ | 17.2 | 48 | 60 | 68.2 |
| CO | 1.5 | 16 | 24 | 28.4 |
| $CO_2$ | 12.8 | 6 | 2 | 0.1 |
| $CH_4$ | 37.7 | 19 | 9 | 2.8 |
| $H_2O$ | 30.8 | 11 | 5 | 0.5 |

The data of Table I indicate that at relatively low temperatures the reactions represented by equations (1) and (3) tend to go to the left to form methane, water vapor and carbon dioxide, whereas at relatively high temperatures the reactions represented by the equations tend to go to the right to form hydrogen and carbon monoxide. However, at temperatures of up to about 700° C. and in the absence of a catalyst, the reaction rates for these reactions are relatively low in relation to the residence time of the gas in the tubular heater and combustion chamber used to heat the reducing gas in the prior art systems. It is known that due to a methanation reaction in the cooling reactor the gas flowing to its reduction reactor heating system contains a substantial amount of methane. Hence the gas mixture will still contain a substantial amount of methane after passing through the tubular heater and combustion chamber and after having been heated to a temperature of 1000° to 1100° C., even though the equilibrium methane concentration at this temperature is only a few percent. Thus the gas mixture can be characterized as unstable under these conditions in the sense that it is substantially displaced from its equilibrium composition.

It is known that iron oxide is an effective catalyst for reactions (1) and (3). Applicants have found that when such an unstable mixture comes into contact with the top of the ore bed in a reduction reactor it equilibrates rapidly. Since the reaction is strongly endothermic, the rapid equilibration of the mixture produces a sudden drop in its temperature. It has been found that this temperature drop may be as much as 90° to 100° C. in the top few inches of the ore bed, and that this temperature drop has a substantial adverse effect on the reduction efficiency of the process.

The present invention is based in part on applicants' finding that this temperature drop at the top of the bed of iron-bearing material can be materially reduced by omitting the combustion chamber of the prior art process described above and using a tubular heater having a superheater section in which the gaseous mixture is indirectly heated to 900° to 1100° C. without addition of air or oxygen thereto and without partial combustion of the gas mixture. It appears that in this way the gas mixture can be at least partially stabilized, i.e., caused to move closer to the equilibrium composition which as indicated in Table I above contains only a few percent of methane at temperatures of the order of 900° C. to 1100° C. It has been found that by this procedure the temperature drop at the top of the bed of iron-bearing material in the reduction reactor can be typically reduced by about one-half or more.

Further, it has been found that the composition of the reducing gas in the tubular heater having a superheater section can be brought more nearly to equilibrium by passing it through a bed of catalyst of a type known to catalyze reactions (1), (2) and (3). As more fully pointed out below, the catalyst body or bodies are desirably located within the tubes of the heater or in a separate catalyst chamber positioned within the heater, and should be located in such a way that the gas passes through the catalyst at a temperature above the equilibrium temperature for carbon deposition. Undesired carbon deposition can generally be avoided if the gas is heated to say at least 800° C. before being brought into contact with the catalyst. When such a catalyst is used within the gas heater, a decrease in the temperature drop at the top of the iron-bearing bed comparable to that obtained without a catalyst can be achieved at a lower reactor gas inlet temperature, i.e., at a temperature of say 900° to 950° C. as compared to a reactor inlet temperature of 1000° to 1050° C. when no catalyst is used.

While the elevated temperature stabilization or equilibration of the reducing gas, either with or without the use of a catalyst, provides a substantial advantage in relation to the prior process described above since it reduces the gas temperature drop in the upper portion of the ore bed, it has been found that still further advantages can be achieved by using a gas stabilizing step in conjunction with two other process steps, namely, (a) feeding the hot, equilibrated gases in parallel to the reduction reactors and (b) cooling the effluent gas from each reduction reactor to remove water therefrom and reheating and recycling at least a substantial part of the cooled gas to the reactor.

As pointed out more fully below, by carrying out all of the heating of the gas to the reduction reactor gas inlet temperature of 900° to 1100° C. in an indirect heater, by using parallel flow of the hot gas to the reduction reactors, and by recirculating gas to each reduction reactor a substantial increase in gas economy can be achieved.

The objects and advantages of the present invention can best be understood and appreciated by reference to the accompanying drawings wherein.

Figure 3:
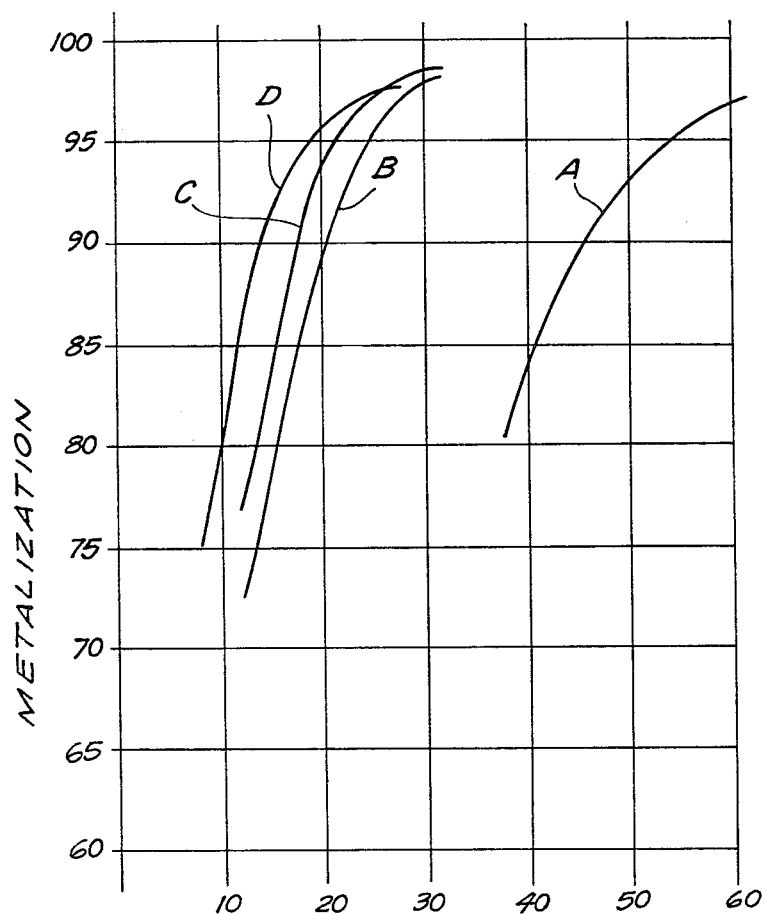
Figure 4:
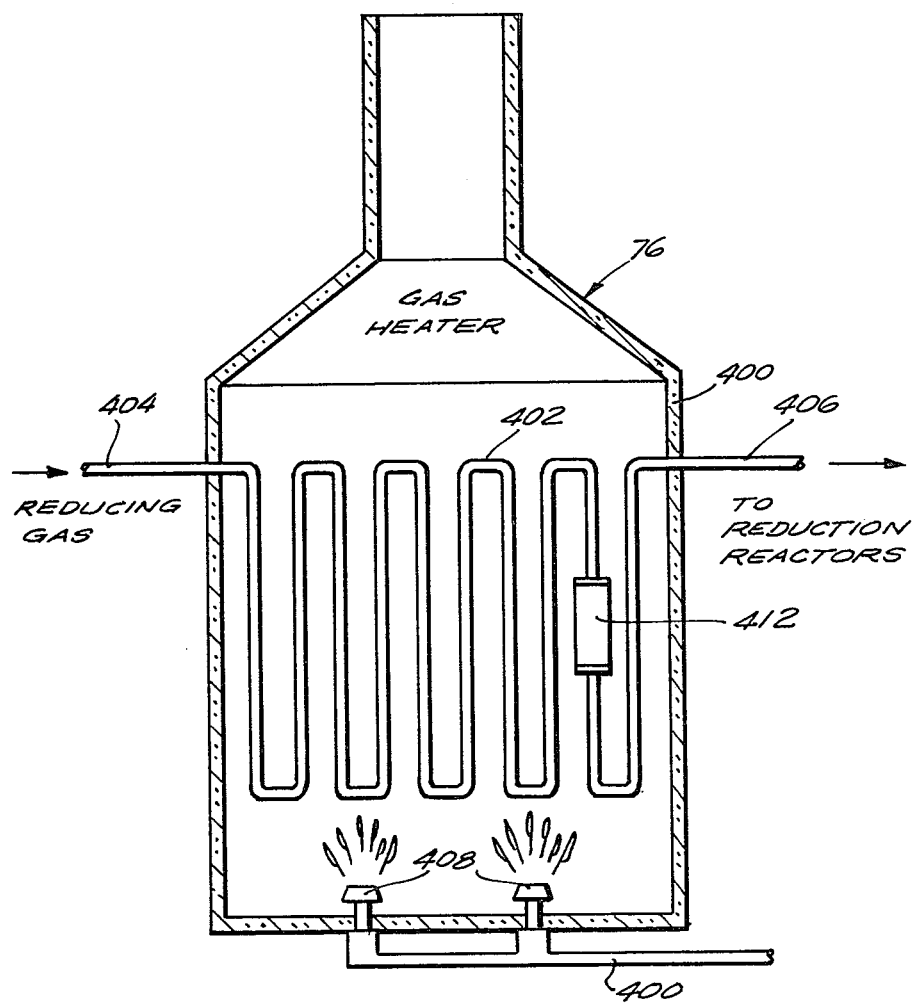

FIG. 3 is a graph showing the extent to which gas economy can be improved when using several modifications of the present process to achieve a variety of different percentage metallizations of the product; and FIG. 4 is a diagrammatic illustration of a reducing gas heater adapted to be used in the embodiment of the invention wherein the reducing gas is passed through a catalyst bed within the heater to accelerate the equilibration of the components of the reducing gas.

Figure 1:
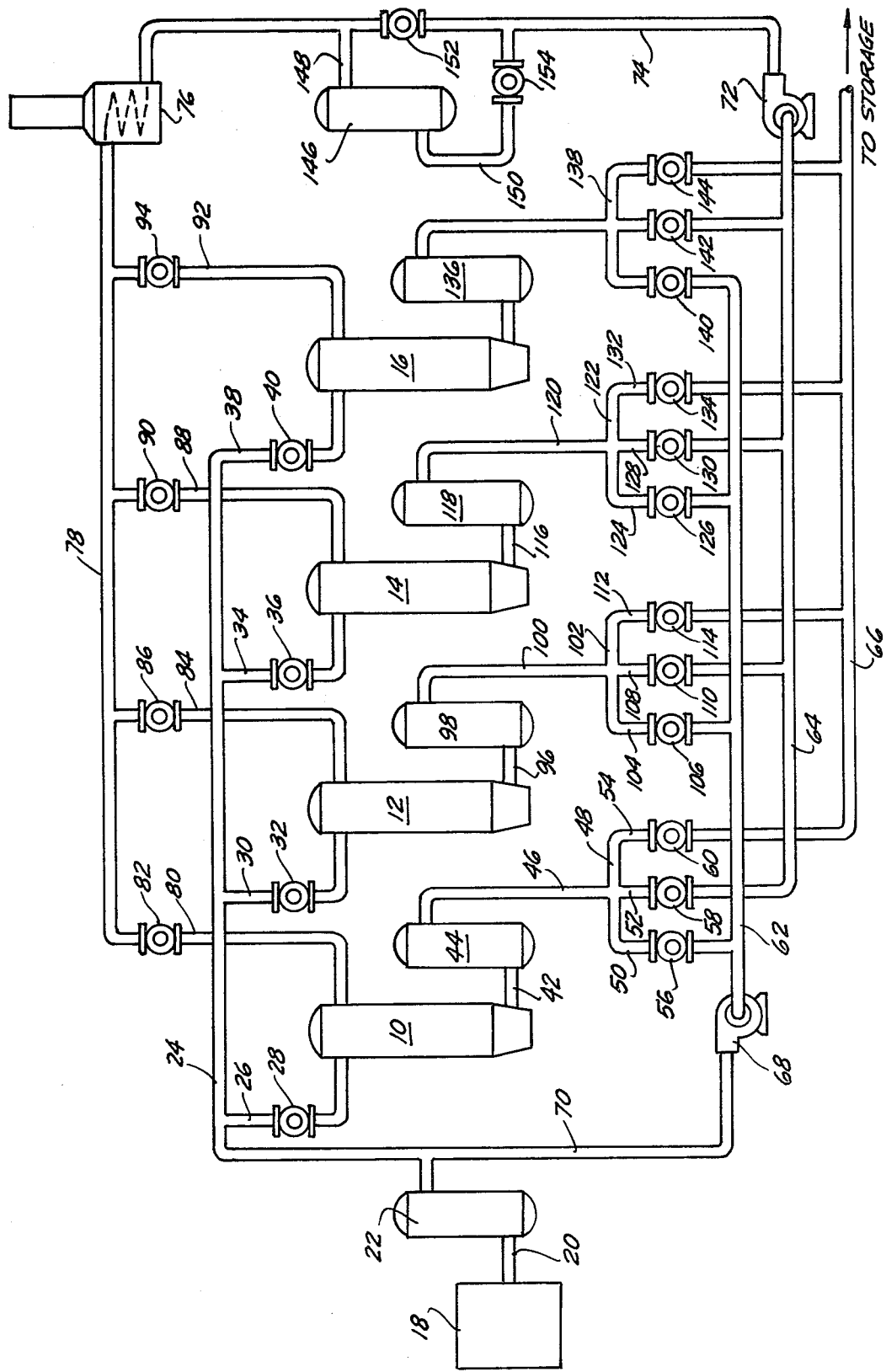
FIG. 1 illustrates diagrammatically a multiple unit reactor system adapted to be used in carrying out a preferred embodiment of the invention and a modification thereof.

Referring particularly to FIG. 1, the system there illustrated comprises four reactors which as indicated above are so connected by pipes and valves that they can be functionally interchanged at the end of an operating cycle. For present purposes the system will be described in terms of an operating cycle in which the reactor 10 is at a cooling stage, the reactor 12 is at a second reduction stage, reactor 14 is a first reduction stage and reactor 16 is at a charging or turn-around stage. During the cycle being described reactor 16 is isolated from the system so that sponge iron can be discharged therefrom and the reactor recharged with fresh ore. Referring to the left-hand side of FIG. 1, a reducing gas composed largely of carbon monoxide and hydrogen is supplied to the system from a suitable source 18. Typically the source 18 may be a well known type of catalytic reformer for reforming a mixture of natural gas and steam into hydrogen and carbon monoxide. However, it will be evident that other sources of gas may also be used.

The gas from source 18 flows through pipe 20 to a quench cooler 22 wherein it is cooled to remove water therefrom and then to a fresh gas header 24 which distributes the fresh reducing gas to the reactors. More particularly, header 24 is connected by a branch pipe 26 containing valve 28 to reactor 10 by a branch pipe 30 containing valve 32 to reactor 12, by a branch pipe 34 containing valve 36 to reactor 14, and by a branch pipe 38 containing valve 40 to reactor 16. For the portion of the cycle here being described, valves 32, 36 and 40 are closed and valve 28 open so that fresh gas flows only to the cooling reactor 10.

Within the cooling reactor 10 the reducing gas flows downwardly through a bed of iron-bearing material that has been largely reduced to sponge iron in previous cycles and cools the product sponge iron prior to its discharge from the reactor. As indicated above, at relatively low temperatures the equilibrium conditions for equations (1) and (3) favor a substantial concentration of methane. Hence within the cooling reactor 10 a certain amount of methanation occurs, i.e., a certain amount of the hydrogen and carbon monoxide generated in reformer 18 react to produce methane.

Effluent reducing gas leaves the cooling reactor 10 through pipe 42 and flows to and through a quench cooler 44 wherein the gas is cooled to condense water therefrom. From cooler 44 the gas flows through pipe 46 to a conduit 48 which is connected to the branch pipes 50, 52 and 54 containing the valves 56, 58 and 60, respectively. Branch pipe 50 is connected to a cooling gas recycle header 62, pipe 52 is connected to a gas transfer header 64, and branch pipe 54 is connected to a spent gas header 66. In the portion of the cycle here being described, valve 60 is closed and valves 56 and 58 are partially opened to cause predetermined fractions of the gas from pipe 46 to flow through each of the branch pipes 50 and 52.

The portion of the gas stream from pipe 46 that enters branch pipe 50 flows through the header 62 to the suction side of pump 68 by which it is pumped through pipe 70 back to the top of cooling reactor 10. The portion of the gas stream from pipe 46 that enters branch pipe 52 flows through the header 64 to the suction side of transfer pump 72 by which it is pumped through pipe 74 to the heater 76 which is a tubulaar heater having a superheater section capable of withstanding temperatures of up to say 1100° C. The heater is gas-fired and serves to heat the gases flowing therethrough to e.g., 1050° C. if no catalyst is used or 900° C. if a catalyst is used.

Referring to FIG. 4, the heater 76 may comprise a housing 400 having a sinuous heating tube 402 therein. Gas is supplied through pipe 404 to the heating tube 402 and leaves the heater through pipe 406. The tube 402 is heated by the burners 408 which are supplied with fuel gas through pipe 410. Connected into the tube 402 within heater 76 there is a catalyst chamber 412 adapted to contain a particulate catalyst for promoting equilibration of reactions (1), (2) and (3) above. While particulate iron can be used to catalyze these reactions, it is not a particularly efficient catalyst for this purpose. However, a variety of hightly efficient commercial catalysts are known for these reactions and one of these commercial catalysts is desirably used, for example the nickel catalyst C-11-09-2 manufactured by United Catalyst Inc.

From heater 76 the gas flows to a hot gas distribution header 78 which as shown in FIG. 1 is connected by branch pipe 80 containing valve 82 to the reactor 10, by a branch pipe 84 containing valve 86 to the reactor 12, by a branch pipe 88 containing valve 90 to the reactor 14, and by a branch pipe 92 containing valve 94 to the reactor 16. During the portion of the cycle here being described valves 82 and 94 are closed and valves 86 and 90 are open. Thus the hot reducing gas from heater 76 flows in parallel through pipes 84 and 88, respectively, to the tops of reactors 12 and 14, respectively. Within the reactors 12 and 14 the hot reducing gas flows downwardly through the iron-bearing bed in each of the reactors to reduce iron oxide therein to sponge iron. As described above, the combustion chamber usually employed in the present industrial plants is omitted in the present system and a tubular heater with a superheater section used instead to achieve a greater stabilization of the reducing gas before it enters the reduction reactors. Thus the initial drop in reducing gas temperature due to the endothermic reaction of equation (1) above that occurs as the gas starts through the iron-bearing beds in the reactors 12 and 16 is smaller than in prior systems, and hence the average temperature in the iron-bearing beds is higher and the reduction process more efficient.

Referring more particularly to reactor 12, the hot gas entering the reactor through pipe 84 flows downwardly through the iron-bearing bed therein, thence out of the reactor through pipe 96, quench cooler 98 and pipe 100 to the conduit 102 which is similar to the conduit 48 associated with reactor 10. Conduit 102 is connected by branch pipe 104 containing valve 106 with cooling gas recycle header 62, by branch pipe 108 containing valve 110 with transfer header 64, and by pipe 112 containing valve 114 with spent gas header 66. During the portion of the cycle here being described, valves 106 and 114 are closed and valve 110 is open.

In like manner, gas supplied by branch pipe 88 to the top of reactor 14 flows downwardly through the bed of iron-bearing material therein, thence through pipe 116 to quench cooler 118 wherein water is removed therefrom and through pipe 120 to conduit 122. The conduit 122 is connected by branch pipe 124 containing valve 126 to the cooling gas recycle header 62 by pipe 128 containing valve 130 to the transfer header 64 and by pipe 132 containing valve 134 to the spent gas header 66. During the portion of the cycle here being described, valve 126 is closed, valve 130 is open and valve 134 is partially open to the extent required to permit the desired amount of spent reducing gas to leave the system through header 66 which conducts it to a suitable point of storage. The spent gas leaving the system through pipe 66 usually has a high enough heating valve to make it useful as a fuel gas either in the reformer and reactors of the present system or elsewhere.

The turn-around reactor 16, like the reactors 10, 12 and 14, is provided with a quench cooler 136, header 138, and branch pipes containing valves 140, 142 and 144 that connect header 138 to the headers 62, 64 and 66, respectively. During the portion of the cycle here being described, all the valves 140, 142 and 144, as well as valves 40 and 94, are closed, thereby isolating the turn-around reactor from the rest of the system.

The reduction reactor effluent gas flowing from reactors 12 and 14 through pipes 108 and 128, respectively, to header 64 is recycled by pump 72 through heater 76, wherein it is reheated, back to the reactors 12 and 14 in parallel. The recycle ratio, i.e., the volumetric ratio of gas flow through pipe 74 to the gas flow from cooling reactor 10 through pipe 52 to the reduction reactor loops is not particularly critical and may typically vary from 1.5:1 to 5:1. In most cases this ratio will be in the range 2:1 to 3:1.

In some cases it may be desirable to increase the reducing power of the gas recirculated through the reduction reactors by removing carbon dioxide therefrom. Referring to th right-hand portion of FIG. 1, carbon dioxide removal may be effected in a conventional $CO_2$ absorber 146 which is connected to pipe 74 by pipes 148 and 150. Valve 152 in pipe 74 and valve 154 in pipe 150 are provided to permit diversion of the recycle gas stream through the $CO_2$ absorber when desired.

From the foregoing description it should be apparent that the system of FIG. 1 differs from prior art systems such as that shown, for example, in U.S. Pat. No. 4,046,556 in a number of significant respects. Thus in the system of FIG. 1, the combustion chambers associated with the reactors are omitted and a heater having a superheating section capable of withstanding temperatures up to say 1100° C. or more is used so that the reducing gas can be heated to the desired reduction reactor inlet temperature without decreasing its reduction efficiency by partial combustion and without contaminating the gas with nitrogen if air is used as the oxidizing agent in the combustion chamber. By so heating the reducing gas, a greater degree of stabilization is achieved, especially in the embodiment of the invention wherein a catalyst is used in the heater, and the gas entering the reactor is more nearly at its equilibrium composition. Also in the system of FIG. 1 the hot reducing gas is fed in parallel to the reduction reactors instead of in series as in the system of U.S. Pat. No. 4,046,556. Still further, the effluent reducing gas from the reduction reactors is cooled, reheated and recycled in the reduction reactors, whereas in the system of the prior patent all of the effluent reducing gas from the second reduction stage flows to the first reduction stage and the effluent gas from the first reduction stage is withdrawn from the system.

While it is true that in U.S. Pat. No. 4,046,556 and certain of the other patents identified herein there is a reference to the use of a superheater, the concept of using a high temperature heater to achieve improved equilibration of the reducing gas mixture prior to its entry into the reduction reactor to reduce the temperature drop sustained by the gas near the top of the bed of iron-bearing material in the reactor is not taught in these prior patents.

As indicated above, it has been found that the combined use of non-combustive heating of the reducing gas, either with or without the use of a catalyst, coupled with parallel flow of the reducing gas to the reactors and recycle of the reducing gas to all of the reduction reactors results in a substantial economy in the gas consumption for a given production rate of a product having a given degree of metallization. The extent of this improvement is indicated by the curves of FIG. 3.

Referring to FIG. 3, the percent metallization of the product sponge iron is plotted as an ordinate against abscissa values that are arbitrary reducing gas flow units. In FIG. 3 curve A represents the results obtained with a prior system generally similar to that disclosed in U.S. Pat. No. 4,046,556. Curves B, C and D are based in part on experimental data and in part on computer simulations of systems incorporating several embodiments of the present invention. More particularly, curve B represents the results obtained with a reduction system such as that shown in FIG. 1, using a catalyst in the heater 76 and wherein the combined gas recycle flow through the two reduction reactors 12 and 14 is approximately twice the flow of reducing gas supplied to the system from source 18 through pipe 20. It will be noted from a comparison of curve A and curve B of FIG. 3 that the present process provides a substantial improvement in the reducing gas consumption at metallization values in the range of 75% to more than 95%. Curve C represents the results to be expected on the basis of computer simulation in a system such as that of FIG. 1 but using a higher recirculation rate such that the volumetric flow of recycled gas is 2.4 times the inlet reducing gas flow through pipe 20. Here, again, a substantial improvement in gas economy as compared with the prior process disclosed in U.S. Pat. No. 4,046,556 is shown. Curve D gives results for a system wherein $CO_2$ is absorbed in absorber 146 and a recycle ratio 2:1 is used.

Figure 2:
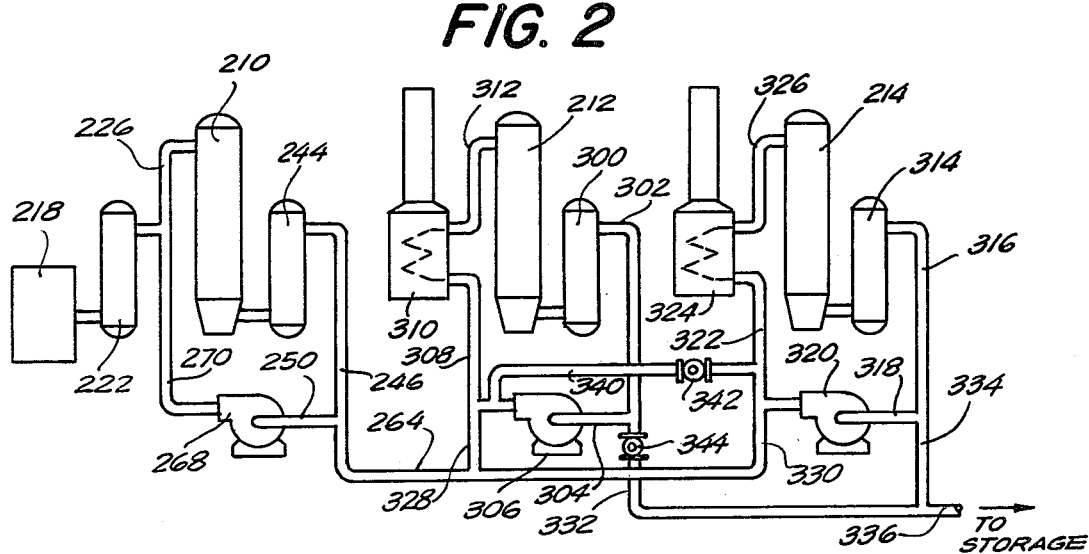
FIG. 2 illustrates diagrammatically a modification of the system of FIG. 1 wherein each of the reduction reactors is incorporated in a separate recirculation loop.

The system of FIG. 2 is generally similar to that of FIG. 1 but differs therefrom in that in FIG. 2 the reduction reactors have independent recycle loops. In FIG. 2 the charging reactor and a number of the pipes and valves have been omitted to simplify the showing. In general the system comprises the cooling reactor 210 and the reduction reactors 212 and 214. Reducing gas from source 218 flows through cooler 222 and pipe 226 to the cooling reactor 210 and downwardly through the bed of iron-bearing material therein. Effluent gas from cooling reactor 210 flows through quench cooler 244 and pipes 246 and 250 to the suction side of pump 268 by which a part of the gas is recycled through pipe 270 to reactor 210.

The system of FIG. 2 differs from that of FIG. 1 in that the reduction reactors 212 and 214 are incorporated in essentially independent loops, each of which includes a circulating pump and heater. More particularly, effluent gas from reduction reactor 212 flows through quench cooler 300 and pipes 302 and 304 to the suction side of pump 306 by which it is pumped through pipe 308, heater 310 and pipe 312 back to the top of reactor 212. In like manner, effluent gas from the reactor 214 flows through quench cooler 314 and pipes 316 and 318 to the suction side of pump 320 by which it is pumped through pipe 322, heater 324 and pipe 326 back to the reactor 214.

A portion of the cooling reactor effluent gas flowing through pipe 246 is withdrawn from the cooling reactor loop through pipe 264 and flows in parallel to the reduction reactor loops. Thus gas from pipe 264 flows through pipe 328 to the second stage reduction reactor loop which it enters near the discharge side of pump 306. Also gas from pipe 264 flows through pipe 330 to the first stage reduction reactor loop which it enters near the discharge side of pump 320. Spent gas may be withdrawn from the second stage reduction reactor loop through a pipe 332 and from the first stage reduction reactor loop through pipe 334. The pipes 332 and 334 merge into pipe 336 through which the spent gas is conducted to a suitable storage facility.

Referring again to FIG. 3 of the drawings, it has been found that a computer simulation of the system of FIG. 2 indicates that it gives results substantially the same as those indicated by curve B. In comparison with curve A, curve B shows that a substantial advantage in terms of reducing gas economy can be achieved by using the modification of the present process illustrated in FIG. 2.

Still referring to FIG. 2, a useful modification of the system described above involves transferring gas from the second stage reduction reactor loop to the first stage loop. Since the gas in the second stage loop is in contact with iron-bearing material that has previously been reduced in a prior stage, it tends to be richer in reducing constituents than the first stage gas. Hence it is sometimes advantageous to transfer relatively rich gas from the second stage loop. For this purpose a pipe 340 containing a valve 342 is provided that interconnects the two loops. Valve 344 in pipe 332 can be partially or wholly closed to restrict or prevent withdrawal of spent gas from the second stage loop and from the system.

From the foregoing discussion it should be apparent that the present invention provides a process capable of achieving the several objects set forth at the beginning of the present specification. It is, of course, to be understood that the foregoing description is intended to be illustrative only and that numerous changes can be made in the specific steps and conditions disclosed. For example, although in the systems of FIGS. 1 and 2 the reducing gas flows through a cooling reactor before being fed to the reduction reactors, the invention can also be used with advantage in a system wherein the reducing gas flows first to the reduction reactors and thereafter to a cooling reactor. As the gas circulates in the reduction reactor loops there is a tendency for the methane and carbon dioxide concentrations to build up. As indicated in equation (3) above, these constituents can react to produce additional carbon monoxide and hydrogen. This equilibration of reaction (3) in accordance with the invention is useful in a system wherein the reducing gas goes first to the reduction reactors.

Other modifications will be apparent to those skilled in the art.

We claim:

1. In a method for the batchwise reduction of iron ore to sponge iron in a multiple unit reactor system of the type in which separate fixed beds of iron-bearing material are simultaneously treated in at least one cooling reactor and at least two reduction reactors and a reducing gas composed largely of carbon monoxide and hydrogen is used to cool the iron-bearing material in said cooling reactor and thereafter to reduce the iron-bearing material in said reduction reactors, the improvement which comprises causing a stream of said reducing gas to pass through the fixed bed of reduced iron oxide in said cooling reactor and then cooling it, recirculating a portion of the cooled reducing gas to the cooling reactor, heating the remainder of the cooling reactor effluent gas in a gas superheater without combustion of said effluent gas to a temperature of at least 900° C. to increase its stability, causing the thus heated cooling reactor effluent gas to flow in parallel through the fixed beds of metal-bearing material in said reduction reactors, cooling the effluent gas from the reduction reactors to remove water therefrom and reheating at least a portion of the cooled effluent gas from the readuction reactors and recirculating it to the reduction reactors.

2. In a method for the batchwise reduction of metal oxides to metals in a multiple unit reactor system of the type in which separate fixed beds of metal-bearing material are simultaneously treated in at least one cooling reactor and at least two reduction reactors and a reducing gas composed largely of carbon monoxide and hydrogen is used to cool the metal-bearing material in said cooling reactor and thereafter to reduce the metal-bearing material in said reduction reactors, the improvement which comprises causing effluent gas from said cooling reactor to flow in parallel through the fixed beds of metal-bearing material in said reduction reactors, heating the gas fed to each reduction reactor to a temperature of at least 900° C. in a superheater to stabilize it before it is fed to said reduction reactor, cooling the effluent gas from the reduction reactors to remove water therefrom, reheating at least a portion of the cooled effluent gas from the reduction reactors and recirculating it to the reduction reactors and removing carbon dioxide from the recirculated portion of the reduction reactor effluent gas before it is reheated.

3. In a method for the batchwise reduction of iron oxides to sponge iron in a multiple unit reactor system of the type in which separate fixed beds of iron-bearing material are simultaneously treated in at least one cooling reactor and at least two reduction reactors and a reducing gas composed largely of carbon monoxide and hydrogen and which may also contain methane, carbon dioxide and water vapor is used to cool the iron-bearing material in said cooling reactor and thereafter to reduce the metal-bearing material in said reduction reactor, the improvement which comprises heating the effluent gas from said cooling reactor to a temperature of at least about 800° C., passing the thus heated gas through a catalyst bed to promote equilibration and stabilization of the components of the reducing gas, and causing said heated and stabilized gas at a temperature of at least about 900° C. to flow in parallel to and through the fixed beds of iron-bearing material in said reduction reactors.

4. In a method for the batchwise reduction of iron oxides to sponge iron in a multiple unit reactor system of the type in which separate fixed beds of iron-bearing material are simultaneously treated in at least one cooling reactor and at least two reduction reactors and a reducing gas composed largely of carbon monoxide and hydrogen and which may also contain methane, carbon dioxide and water vapor is used to cool the iron-bearing material in said cooling reactor and thereafter to reduce the metal-bearing material in said reduction reactor, the improvement which comprises heating the effluent gas from said cooling reactor to a temperature of at least about 800° C., passing the thus heated gas through a catalyst bed to promote equilibration and stabilization of the components of the reducing gas, causing said heated and stabilized gas at a temperature of at least about 900° C. to flow in parallel to and through the fixed beds of iron-bearing material in said reduction reactors, cooling the effluent gases from said reduction reactors to remove water therefrom and recycling at least a part of said cooled gas to the initial heating step as set forth above.

5. In a method for the batchwise reduction of iron ore to sponge iron in a multiple unit reactor system of the type in which separate fixed beds of iron-bearing material are simultaneously treated in at least one cooling reactor and at least two reduction reactors and a reducing gas composed largely of carbon monoxide and hydrogen is used to cool the iron-bearing material in said cooling reactor and thereafter to reduce the iron-bearing material in said reduction reactor, and each of said reduction reactors forms part of a gas circulating loop within which the gas is heated before entering the reactor and the effluent gas is cooled after leaving the reactor, the improvement which comprises causing a stream of said reducing gas to pass through the fixed bed of reduced iron oxide in said cooling reactor and then cooling it, recirculating a portion of the cooled reducing gas to the cooling reactor, causing the remainder of the cooling reactor effluent gas to flow in parallel to said reduction reactor gas circulating loops and heating the circulating gas in each reduction reactor loop in a gas superheater without combustion of the circulating gas to a temperature of at least 900° C. to increase its stability before it enters said reduction reactor.

6. A method according to claim 5 wherein gas is transferred from one of said reduction reactor loops to another reduction reactor loop and spent gas is withdrawn from at least one of said loops.

7. In a method for the batchwise reduction of iron ore to sponge iron in a multiple unit reactor system of the type in which (a) separate fixed beds of iron-bearing material are simultaneously treated in at least one cooling reactor and at least two reduction reactors, (b) a reducing gas composed largely of carbon monoxide and hydrogen is used to cool the iron-bearing material in said cooling reactor and thereafter to reduce the iron-bearing material in said reduction reactors, (c) a stream of said reducing gas is caused to pass through the fixed bed of reduced iron ore in said cooling reactor and then cooled and (d) a portion of the cooled effluent reducing gas from said cooling reactor is recycled thereto, the improvement which comprises causing the remainder of the cooling reactor effluent gas to be fed to said reduction reactors and to flow in parallel through the fixed beds of metal-bearing material in said reduction reactors, and heating the reducing gas fed to said reduction reactors before it enters said reactors in a gas superheater without combustion of said gas to a temperature of at least 900° C.

* * * * *